(12) United States Patent  (10) Patent No.: US 7,162,829 B2
Braaten  (45) Date of Patent: Jan. 16, 2007

(54) FISHING DEVICE

(76) Inventor: James L. Braaten, 22870 Unser St. NE., Bethel, MN (US) 55005

( * ) Notice: Subject to any disclaimer, the term of this patent is extended or adjusted under 35 U.S.C. 154(b) by 17 days.

(21) Appl. No.: 10/827,588

(22) Filed: Apr. 19, 2004

(65) Prior Publication Data
US 2005/0229474 A1  Oct. 20, 2005

(51) Int. Cl.
A01K 85/14 (2006.01)
A01K 85/00 (2006.01)

(52) U.S. Cl. .................... 43/42.23; 43/42.49; 43/42.5

(58) Field of Classification Search ............. 43/42.36, 43/42.23, 42.02, 42.49, 42.5, 42.52, 42.04, 43/42.05, 42.22, 43.13
See application file for complete search history.

(56) References Cited

U.S. PATENT DOCUMENTS

| | | | | | |
|---|---|---|---|---|---|
| 2,412,399 | A | * | 12/1946 | Miller | 43/43.13 |
| 2,463,889 | A | * | 3/1949 | Lundemo | 43/42.49 |
| 2,570,404 | A | * | 10/1951 | Stirlen | 43/42.36 |
| 2,780,884 | A | * | 2/1957 | Hadfield | 43/42.49 |
| 2,795,076 | A | * | 6/1957 | Luft | 43/42.49 |
| 2,951,308 | A | * | 9/1960 | Kent | 43/42.36 |
| 3,243,912 | A | * | 4/1966 | Newman | 43/42.49 |
| 3,466,787 | A | * | 9/1969 | Collins | 43/43.13 |
| 3,497,986 | A | * | 3/1970 | Bianco | 43/42.5 |
| 3,667,148 | A | * | 6/1972 | Dawson | 43/43.13 |
| 3,688,434 | A | * | 9/1972 | Le Vau | 43/42.23 |
| 3,708,904 | A | * | 1/1973 | Zaharis | 43/42.23 |
| 3,908,299 | A | * | 9/1975 | Kalberer | 43/43.13 |
| 3,956,847 | A | * | 5/1976 | Bayes | 43/42.49 |
| 3,971,154 | A | * | 7/1976 | Craig | 43/42.23 |
| 3,981,096 | A | * | 9/1976 | Toivonen | 43/42.5 |
| 4,037,348 | A | * | 7/1977 | Kruger | 43/42.23 |
| 4,129,957 | A | * | 12/1978 | Thirlby | 43/42.49 |
| 4,411,090 | A | * | 10/1983 | Seals | 43/43.13 |
| 4,581,841 | A | * | 4/1986 | Gish | 43/42.02 |
| 4,594,806 | A | * | 6/1986 | Brown | 43/42.5 |
| 4,665,643 | A | * | 5/1987 | Shiau | 43/42.23 |
| 4,700,503 | A | * | 10/1987 | Pippert | 43/42.5 |
| 4,713,906 | A | * | 12/1987 | Distaffen | 43/42.5 |
| 4,807,388 | A | * | 2/1989 | Cribb | 43/42.22 |
| 4,891,900 | A | * | 1/1990 | Snyder | 43/42.52 |
| 5,058,309 | A | * | 10/1991 | Firmin | 43/42.13 |
| 5,193,300 | A | * | 3/1993 | Johnson | 43/43.13 |
| 5,375,366 | A | * | 12/1994 | Johnson | 43/43.13 |
| 5,461,819 | A | * | 10/1995 | Shindledecker | 43/42.13 |
| 5,887,378 | A | * | 3/1999 | Rhoten | 43/42.23 |
| 6,122,854 | A | * | 9/2000 | Kinnear | 43/42.02 |
| 6,173,522 | B1 | * | 1/2001 | Couch | 43/42.23 |
| 6,430,867 | B1 | * | 8/2002 | Johnston et al. | 43/42.23 |
| 6,453,600 | B1 | * | 9/2002 | Craig | 43/43.13 |
| 6,457,275 | B1 | * | 10/2002 | Spurgeon | 43/42.5 |

FOREIGN PATENT DOCUMENTS

| | | | | |
|---|---|---|---|---|
| DE | 2511414 A1 | * | 9/1976 | 43/43.13 |
| SE | 189050 A1 | * | 4/1964 | 43/43.13 |

* cited by examiner

*Primary Examiner*—Darren W. Ark
(74) *Attorney, Agent, or Firm*—Brooks & Cameron, PLLC

(57) ABSTRACT

Embodiments of the present invention include a number of fishing devices. One embodiment of a fishing device includes a device assembly and an elongate rail. The device assembly includes an elongate body having an exterior surface. The elongate rail includes a first junction and a second junction positioned along a surface of the elongate body. The rail receives a line attachment member that is slidable along the rail.

15 Claims, 3 Drawing Sheets

FISHING DEVICE

BACKGROUND OF THE INVENTION

The present invention relates generally to lures and other attractive devices for fishing, and more specifically to a fishing lure which is directionally controllable by an angler using the lure.

Sport and commercial fishing are world-wide industries in which people of all skill levels participate. Throughout the world, anglers search for effective ways to find and catch fish. Fish are often found in certain areas of lakes, rivers, and streams that are difficult for anglers to position their lures.

For example, casting a lure in or near vegetation, under docks, and under low hanging branches often presents challenges for the delivery of the lure. However, such dwelling areas oftentimes provide favorable fishing areas. Thus, anglers often cast lures in such locations and oftentimes, the lure can become caught or snagged (e.g., because of weeds, low hanging branches, and other obstructions). When lures become caught or snagged, the angler often loses the lure or is at least unable to conveniently reach the area to retrieve the lure. Since conventional lures provide for a straight return path to the angler, even if an angler is skilled enough to avoid snags and other obstructions on the cast of the lure, the risk of the lure being drawn into obstructions between the angler and the return path of the lure often results in snagging. As a result, many favorable fishing areas are not accessible to anglers due to such obstructions and because of the risk of losing the lure.

DETAILED DESCRIPTION

Figure 1A:
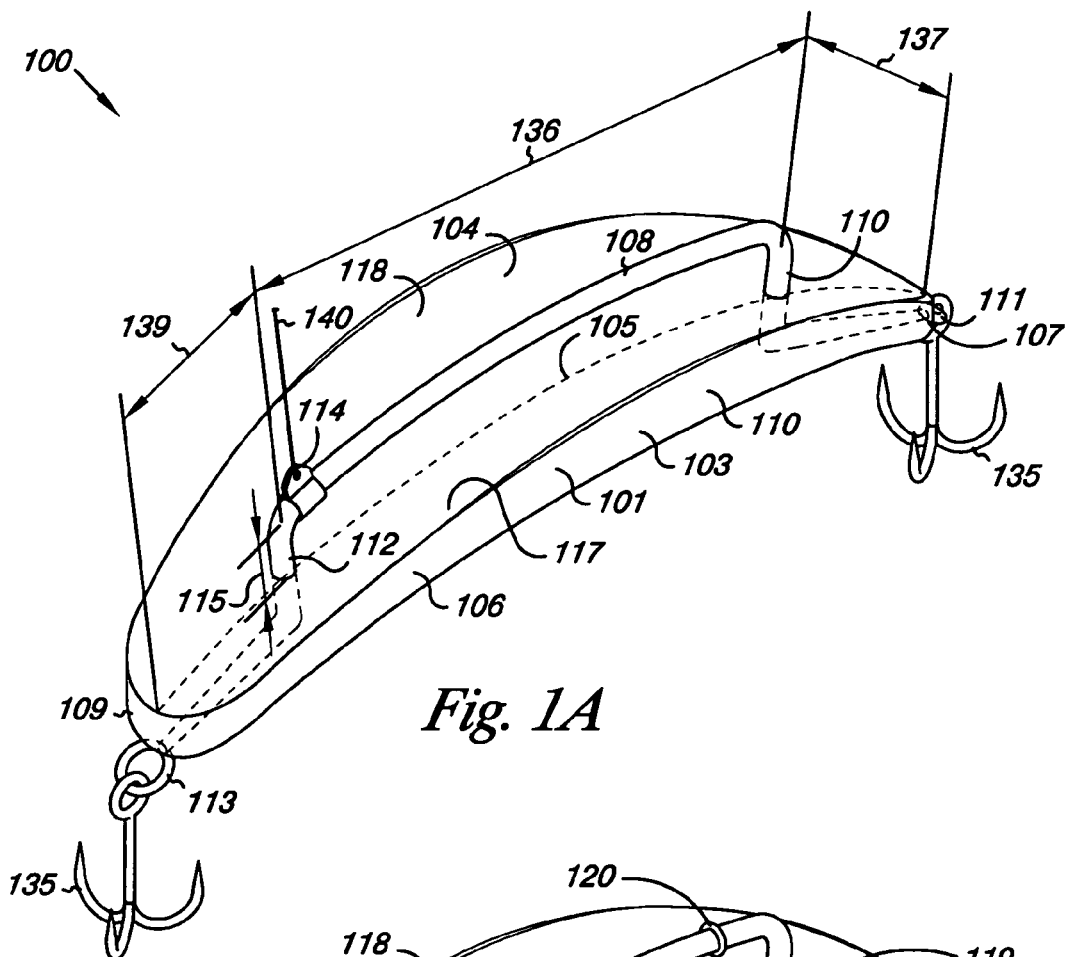
FIG. 1A illustrates an embodiment of a fishing lure including a rail.

Embodiments of the present invention provide a fishing device that the angler can cast to a safe point near a favorable fishing area and then control the direction of travel of the fishing device to and from the favorable fishing area one or many times during the return of the fishing device to the angler. The direction of the fishing device is controlled by the angler. The direction of travel of the fishing device through water can be selected by the angler by controlling the movement of a line attachment member coupled to the fishing device, thereby providing multidirectional control of the device to the angler.

Embodiments of the present invention include various structures that provide for moving a line attachment member along an elongate body of a device assembly. In this way, the position of the line attachment member with respect to the elongate body determines a direction of travel of the fishing device through the water.

Embodiments of the present invention are illustrated in FIGS. 1A, 1B, 2A, and 2B and include, but are not limited to, fishing devices having elongate bodies having one or more rails coupled thereto, the rails capable of receiving a slidable line attachment member; elongate bodies having channels, the channels capable of receiving slidable line attachment members, and the like. Embodiments of the invention also include structures having stopper members that function to preclude movement of the slidable line attachment member in one or more directions. Fishing devices as described herein include devices that can be utilized to indicate caught fish, and to attract and to catch fish, such devices including, but not limited to, fishing lures, fishing bobbers, sinkers, and the like. In various embodiments, such as those used for catching fish, a device assembly can be a bait assembly.

The Figures herein follow a numbering convention in which the first digit or digits correspond to the drawing Figure number and the remaining digits identify an element or component in the drawing. Similar elements or components between different Figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide any number of additional embodiments of the fishing lure or its components.

FIG. 1A illustrates an embodiment of a fishing lure including a rail. As shown in FIG. 1A, various embodiments of a fishing lure 100 include a bait assembly 101 having an elongate body 103 that has a first end 107 and a second end 109. The bait assembly 101 can be of various geometric shapes and sizes including, but not limited to: ovular, round, polygonal, and irregular, among others. Shapes can also include shapes that resemble natural baits, e.g., minnows, fish, crawfish, worms, leeches, and the like.

In addition to the various shapes and sizes, the elongate body 103 of the bait assembly 101 can include various cross sectional shapes including, but not limited to: crescent, circular, ovular, square, irregular and other geometric shapes including polygonal cross sections. For example, in the embodiment shown in FIG. 1A, the general cross section is a crescent shape. In the embodiments shown in FIG. 1A, the crescent cross-sectional shape is formed by an exterior surface of the elongate body 103 having a first surface 104 with a concave shape (similar to that of the first surface 204 of the embodiment shown in FIG. 2B) and a second surface 106 with a convex shape (similar to that of the first surface 206 of the embodiment shown in FIG. 2B). Since the first and second surfaces 104 and 106 of the exterior surface of the elongate body 103 are used to form the cross-section described above, those of ordinary skill in the art will understand that the first and second surface can be any number of shapes. For example, the elongate body 103 of the bait assembly 101 can include a spoon, as is known in the art.

In the embodiment shown in FIG. 1A, the elongate body 103 of the bait assembly 101 is bowed away from the rail 108 and toward the second surface 106. The concave shape of the first surface 104 of the bait assembly 101 can provide for a flow resistance to produce a rudder effect for the lure as it is being drawn through water by an angler. As used herein, flow resistance is intended to mean the water's fluid friction force, i.e., drag, imparted on the bait assembly 101, as the bait assembly 101 is drawn through water by an angler. In addition, in various embodiments, the elongate body 103 of the bait assembly 101 can include members that provide for flow resistance such as fins and bills. In such embodiments, a fin or bill can be located at various positions of the exterior surface of the elongate body 103, such as on the first surface 104 and on face regions 137 and 139 of the first surface 104.

In various embodiments, the fishing lure 100 can include face regions. For example, in the embodiment shown in FIG. 1A, a first face region 137 and a second face region 139 are illustrated. The face regions 137 and 139 can be defined as the region of the first surface 104 that extends from an end of the bait assembly 101 to the junction of the rail 108 with the first surface 104. For instance, in the embodiment shown in FIG. 1, the first face region 137 includes the portion of the first surface 104 that extends from the first end 107 of the bait assembly 101 to the first junction 110 of the rail 108. The second face region 139 is defined by the portion of the first surface 104 that extends from the second end 109 of the bait assembly 101 to the second junction 112 of the rail 108.

The face regions 137 and 139 can provide flow resistance, thereby producing a rudder effect as discussed above. Thus, in various embodiments, flow resistances imparted on the face regions 137 and 139 can vary depending on the shape and size of the face regions 137 and 139 relative other portions of the first surface 104 of the elongate body 103, e.g., non-face regions of the first surface 104.

In various embodiments, the size and shape of the face regions 137 and 139 can vary. For example, the face regions can include various geometric shapes, including but not limited to: concave, convex, flat, and irregular, among others. Face regions 137 and 139 of the first surface 104 can include shapes that differ from the remaining portion of the first surface 104 and each other, thereby imparting varying levels of flow resistance along the first surface 104. For example, in various embodiments, face region 137 can include a flat surface and face region 139 can include a concave surface.

In various embodiments the bait assembly can include a rail 108. For example, in the embodiment shown in FIG. 1A, a rail 108 having a first junction 110 and a second junction 112 is positioned along the first surface 104 of the bait assembly 101.

The rail 108 can be oriented along a direction of elongation of the elongate body 103. In some embodiments, the rail 108 can be positioned along longitudinal axis 105. In other embodiments, the rail 108 can be positioned along a direction of elongation away from the longitudinal axis 105. For example, the rail 108 can be positioned along the bait assembly 101 such that a first junction 110 is positioned on a side of the longitudinal axis 105 opposite a side of the longitudinal axis 105 in which the second junction 112 is positioned. In such a configuration, an upward and downward travel of the fishing lure 100 through the water can be varied relative to an upward and downward travel of the fishing lure 100 when the rail 108 is positioned on the longitudinal axis 105.

In various embodiments, the interface of the rail 108 with elongate body 103 can anchor the rail 108 to the bait assembly 101. For example, in the embodiment shown in FIG. 1A, the rail 108 bends toward the first surface 104 of the exterior surface of the elongate body 103 and enters the bait assembly 101 at the first junction 110 and at the second junction 112. The first and second junctions 110 and 112 can define, among other things, the point at which the rail 108 extends into the elongate body 103 of the bait assembly 101, thereby anchoring the bait assembly to the rail 108. In various embodiments, the rail 108 can extend a predetermined length within the bait assembly 101. As one of ordinary skill will understand, the further the rail 108 extends into the bait assembly 101 at the junctions 110 and 112, the greater the anchoring ability the rail 108 can provide. The ends of the rail 108 that extend into the elongate body 103 can also have various shapes that can help in the anchoring of the rail 108. For example, the ends of the rail 108 can have a diameter larger than the diameter of the rail, e.g., pinhead shaped. And in various embodiments, the ends of the rail 108 can include a barb for additional anchoring ability.

In various embodiments, the rail 108 can extend through the bait assembly 101. That is, in various embodiments, the rail 108 can extend into the bait assembly 101 at the first and second junctions 110 and 112 and the ends of the rail 108 can project from the bait assembly 101 at one or more other points along the exterior surface of the bait assembly 101.

Figure 1B:
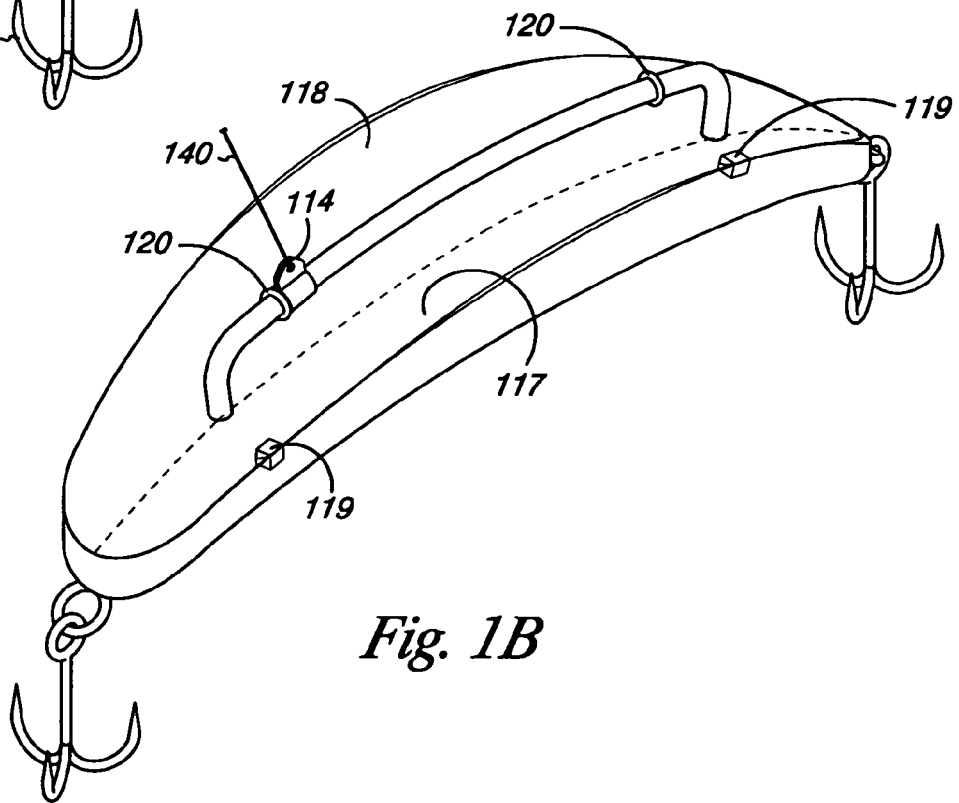
FIG. 1B illustrates another embodiment of a fishing lure including a rail.

For example, in the embodiment shown in FIG. 1A, the rail 108 extends into the bait assembly at the first junction 110 and the second junction 112 and the rail exits the bait assembly 101 through the second surface 106 at a first rail end 111 and a second rail end 113. In such an embodiment, the extension of the rail 108 through the bait assembly 101 can provide for anchoring of the rail 108 to the bait assembly 101 at two locations, the first and second junctions 110 and 112 and the first and second rail ends 111 and 113. The rail ends 111 and 113, in addition to anchoring the rail 108 to the bait assembly 101, can also function to couple fish hooks 135 to the bait assembly 101 as shown in FIGS. 1A and 1B.

The elongate rail 108 can be positioned at various distances 115 from the first surface 104, thereby providing a space between the first surface 104 and the rail 108 for a slidable line attachment member 114 to freely travel along the rail 108, as will be discussed herein.

The elongate rail 108 can be various lengths 136. For example, the length 136 of the elongate rail 108 can be the distance between the first junction 110 and the second junction 112. In various embodiments, the distance between the first junction 110 and the second junction 112 of the rail 108 can be a length of at least fifty percent of the length of the elongate body 103, e.g., fifty percent or greater. The distance between the first junction 110 and the second junction 112 of the rail 108 can be a length of the rail 108 at most fifty percent of a length of the elongate body 103, e.g., fifty percent or less. For example, in the embodiments illustrated in FIGS. 1A and 1B, the rail 108 is a length of at least fifty percent of the length of the elongate body 103, e.g., fifty percent or greater.

In various embodiments, the rail 108 can be formed from rigid materials including; metals, metal alloys, plastics, and any other material suitable for resisting tension applied to the rail by external forces such as fishing line tension and tension created by fighting fish. In embodiments where the rail is formed of metals or metal alloys, a rust proof coating can be applied thereto, or a stainless steel alloy can be used.

Additionally, in various embodiments, the first and second junctions 110 and 112 can restrict the slidability of the line attachment member 114. For example, an angler can manipulate fishing line 140 attached to a line attachment member 114 to cause the line attachment member 114 to move to a junction 110 or 112 or to a location proximal the junction such as where the rail 108 bends toward the first surface 104 of the exterior surface at the junctions 110 and 112. At the junctions 110 or 112, the line attachment member 114 is precluded from moving off the fishing lure 100, thereby creating fishing line 140 tension and thus, effecting the movement of the fishing lure 100 through the water, as will be discussed more thoroughly below.

As used herein, lateral travel of the fishing lure is intended to mean the leftward or rightward direction of the travel of the fishing lure relative the angler. The degree of lateral travel is intended to mean the angle of the leftward or rightward travel of the fishing lure relative the angler. A higher degree of lateral travel will result in a more rightward or leftward direction of travel than a lower degree of lateral travel.

According to the embodiments described herein, the length of the rail 108 can help to determine a degree of lateral travel of the fishing lure 100 through water relative the angler. The junctions 110 and 112 preclude the line attachment member 114 from moving off the rail 108. Because the line attachment member 114 is precluded from moving off the rail 108, fishing line tension can be created when the fishing lure 100 is being manipulated by an angler to move through the water. Thus, rail lengths 136 such as those that are fifty percent or less of the length of the elongate body 103 will provide for first and second junctions 110 and 112 positioned closer together, thereby providing for a greater amount of surface area on the face regions 137 and 139. As discussed herein, a greater amount of surface area on a face region will provide for a greater degree of lateral travel of the fishing lure relative the angler. As one of ordinary skill in the art will appreciate, the shape of the bait assembly including the exterior surface and the face regions can vary the degree of lateral travel of the fishing lure relative the angler.

In contrast, where the length of the rail 108 is at least fifty percent of the length of the elongate body 103, a lower degree of lateral travel of the fishing lure 100 relative the angler can generally be achieved than in embodiments where the length of the rail 108 is at fifty percent or less of the length of the elongate body 103. That is, a lower degree of lateral travel can result in the lure taking a more direct path back to the angler, than a higher degree of lateral travel.

As stated above, the rail 108 can receive a line attachment member 114. The line attachment member 114 can include a variety of shapes and sizes. Examples of line attachment members 114 can include, but are not limited to, split rings, key rings, triangle rings, jump rings, clevises, swivels, and snaps, among others.

The line attachment member 114 can provide a point of attachment for fishing line 140 or any other suitable line. In the embodiment shown in FIG. 1A, the line attachment member 114 is coupled to both fishing line 140 and moveably coupled to the rail 108. Such a configuration can provide for manipulation of the line attachment member 114 by an angler in a multi-directional movement along the rail 108. Movement of the line attachment member 114 to the first junction 110 or the second junction 112 of the rail 108 by the angler's manipulation of the fishing line can provide for multi-directional control of the fishing lure 100 through water, as discussed herein. The multi-directional control includes lateral travel of the fishing lure 100 through water relative the angler, the lateral travel including travel to the left, the center, and to the right of the angler. As discussed above, multidirectional travel can also include up and down travel of the fishing lure 100.

With respect to lateral travel, for example, when the angler desires to move the fishing lure 100 in a direction of travel to the left of the angler, the angler can manipulate her fishing rod to cause the line attachment member 114 to move along the rail 108 to the second junction 112, as shown in FIG. 1A. Because the second junction 112 extends into the bait assembly 101, the second junction 112 can function to preclude further movement of the line attachment member 114. With the line attachment member 114 precluded by the second junction 112 from sliding off the rail 108, fishing line tension can be created thereby causing fluid flow resistance of the fishing lure 100 as it is drawn through the water in a leftward direction of travel relative the angler. The fluid flow resistance causes the fishing lure to travel in a downward and leftward direction of travel relative the angler.

FIG. 1B illustrates another embodiment of a fishing lure including a rail. As shown in FIG. 2B, in various embodiments, the rail 108 can include one or more adjustable stopper members 120. The adjustable stopper members 120 can include a variety of structures and materials. For example, the stopper member 120 can include a ring member made of rubber that forms a tight but adjustable fit around the circumference of the rail 108. The adjustability of the stopper member 120 can provide for the movement of the stopper member 120 to a desired location on the rail 108. In other embodiments, the stopper member 120 can include a split shot fishing weight, i.e., removable fishing weight that can be temporarily attached to the rail 108 according to a location on the rail 108 set by the angler.

The adjustable stopper member 120 can restrict the slidability of the line attachment member, and thereby, preclude the line attachment member 114 from moving past the stopper member 120. The stopper member 120 can prevent the line attachment member 114 from moving past it by restricting the slidability of the line attachment member 114 along the rail 108. Thus, the adjustable stopper member 120 can include a predetermined size relative to the size of the line attachment member 114. The adjustable nature of the stopper member 120 provides for the creation of fishing line tension at various locations on the rail 108. That is, the point at which the line attachment member 114 is precluded from moving produces a fishing line tension at that point and thus, the adjustable stopper member 120 can function to vary the location on the rail 108 at which fishing line tension is created, thereby, varying the amount of surface area between the stopper member and an end of the fishing lure. Thus, the adjustable stopper member 120 can help to vary the degree of lateral travel of the fishing lure through the water relative the angler.

As one of ordinary skill in the art will understand, the amount of surface area between a line attachment member 114 and an end of the bait assembly 101 proximal to the line attachment member 114 can help to determine the angle of lateral travel of the fishing lure through water relative the angler. This is so because the surface area between an end of the bait assembly 101 and a line attachment member 114 proximal that end of the bait assembly 101 can provide flow resistance to produce a rudder effect of the bait assembly 101 that results in a higher amount of lateral travel of the fishing lure through water than if a lesser amount of surface area between an end of the bait assembly 101 and a line attachment member 114 proximal that end were provided. Thus, the amount of surface area between the line attachment member 114 and an end of the bait assembly 101 can help to determine the level of flow resistance, and therefore, the degree of lateral travel of the fishing lure 100 relative the angler. As discussed above, a stopper member 120 can be used restrict the slidability of the line attachment member 114, and therefore, can vary the degree of lateral travel of the fishing lure. Additionally, and as discussed herein, the face regions 137 and 139 can also vary the degree of lateral travel of the fishing lure. Thus, the combination of the face regions 137 and 139 and the surface area between an end of the bait assembly 101 and the line attachment point 114 proximal that end can provide for various fluid flow resistances for lateral travel of the fishing lure 100 through the water.

The bait assembly 101 can include various materials possessing buoyant and non-buoyant properties. For example, buoyant materials can include, but are not limited to: wood, plastic, and foam, including plastic foams having closed plastic cells which trap air and provide flotation. Examples of such foams can include Polyvinyl Chloride (PVC), Polyethylene (PE), and Neoprene, to name a few. In various embodiments, the bait assembly 101 can include non-buoyant materials including, but not limited to, metals and metal alloys, among others.

However, one of ordinary skill in the art will appreciate that fishing devices such as fishing lures and bobbers formed of a metal and/or a metal alloy that contain air pockets or air chambers can be buoyant. Embodiments of the present invention include such fishing device designs.

The elongate body 103 of the bait assembly 101 can include an upper portion 118 and a lower portion 117. In various embodiments, the lower portion 117 can include ballast 119, as shown in FIG. 1B. Those of ordinary skill in the art will understand the different types of ballast and the manners in which ballast can be used. For example, in various embodiments, the ballast 119 can include at least two symmetrically positioned ballast weights 119 of equal weight. The ballast weights 119 can orient the lure with the lower portion 117 oriented below the upper portion 118 while floating in water. In this way, the ballast 119 can resist a tendency for the lure to roll about its longitudinal axis 105 while floating in water.

As stated above, the bait assembly 101 of the fishing lure 100 can include one or more fish hooks 135. One or more fish hooks 135 can be positioned at various locations along the exterior surface of the elongate body 103. For example, in the embodiment shown in FIGS. 1A and 1B, one or more fish hooks are coupled to a first rail end 111 and a second rail end 113 of the rail 108, which protrudes from the exterior surface at second surface 106. Additionally, one or more fish hooks 135 can be positioned at other locations along the second surface 106. That is, fish hook coupling members, e.g., eyelets, can be anchored to the bait assembly at various locations for fish hook 135 attachment in order to secure the fish hooks to the bait assembly 101.

Figure 2A:
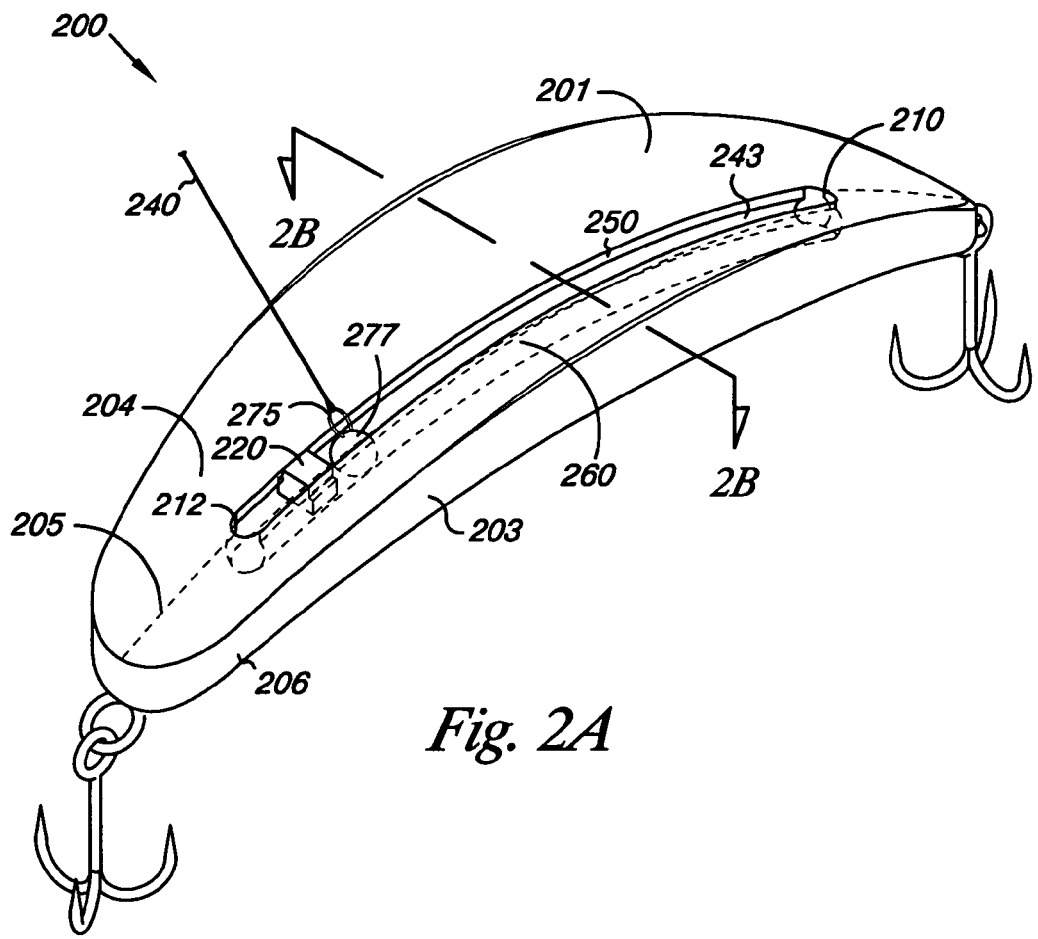
FIG. 2A illustrates an embodiment of the fishing lure including a channel.
Figure 2B:
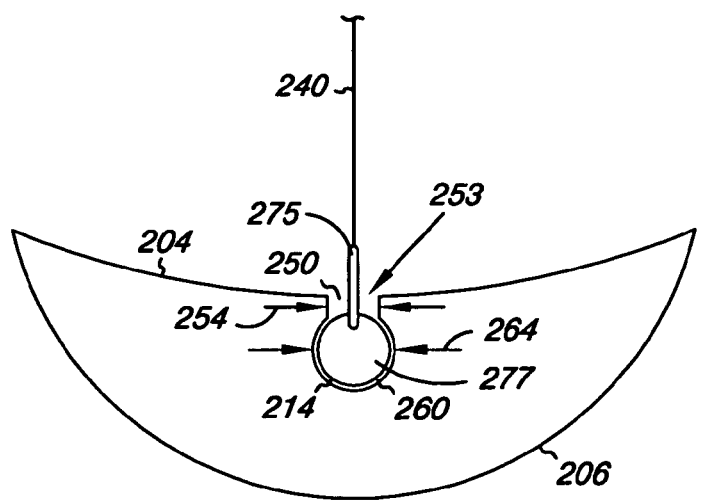
FIG. 2B illustrates a cross-section of the fishing lure of FIG. 2A.

FIGS. 2A and 2B illustrate an embodiment of a fishing lure 200. FIG. 2A illustrates an embodiment of the fishing lure including a channel and FIG. 2B illustrates a cross-section of the fishing lure of FIG. 2A. In embodiments such as that shown in FIGS. 2A and 2B, the fishing lure 200 can include a first surface 204 and a second surface 206 as described herein. The first surface 204 can include an elongate channel 250 defining an opening 253 having a width 254 and a chamber 260. The channel 250 includes a channel length that can be any length. For example, the channel length can be at least fifty percent of the length of the elongate body 203. In various embodiments, the channel 250 can be a channel length of fifty percent or less of the length of the elongate body 203. The width 254 of the channel 250 can be any various widths and can have a width smaller than a width 264 of the chamber 260.

The elongate chamber 260 as has a width 264. The width 264 of the chamber 260 can be larger than the width 254 of the channel 250. In this way, the channel width 254 can preclude a line attachment member 214 from moving off the elongate body 203 of the bait assembly 201, as will be discussed herein. In various embodiments, the length of the channel 250 can equal the length of the chamber 260; however the invention is not so limited.

In various embodiments, the channel 250 and the chamber 260 can be positioned along longitudinal axis 205. In some embodiments, the channel 250 and the chamber 260 can be positioned along a direction of elongation away from the longitudinal axis 205. For example, in one embodiment, the channel 250 and the chamber 260 can be positioned along the first surface 204 of the bait assembly 201 such that a first channel/chamber end 210 is positioned on the opposite side of the longitudinal axis 205 to which a second channel/chamber end 112 is positioned. In such a configuration, an upward and downward travel of the fishing lure 200 through the water can be varied relative to an upward and downward travel of the fishing lure 200 having the channel 250 and chamber 260 positioned on the longitudinal axis 205.

In various embodiments, the chamber 260 can receive a line attachment member 214 having a first part 275 and a second part 277. In various embodiments, the line attachment member 214 can include varying shapes and sizes, and the line attachment member 214 can include various materials including, but not limited to: metals, metal alloys, and plastics.

In the embodiment shown in FIG. 2B, the first part 275 of line attachment member 214 can extend through the opening 253 of the channel 250 and at a predetermined distance above the first surface 204. The first part 275 can include any shape capable of extending through the opening 253 of the channel 250. The first part 275 can include an eyelet for coupling fishing line 240 thereto. Examples of eyelets include, but are not limited to: split rings, key rings, triangle rings, jump rings, clevises, swivels, and snaps, among others.

In various embodiments, the first part 275 can be coupled to a second part 277. In the embodiment shown in FIG. 2A, the second part 277 of the line attachment member 214 includes a spherical shape; however, the second part 277 can include any shape capable of being slidably positioned within the chamber 260. In various embodiments, the second part 277 can include a diameter larger than the width 254 of the channel 250 but smaller than the width 264 of the chamber 260. Thus, the second part 277 of the line attachment member 214 can move freely within the chamber 260 while being precluded from moving out of the chamber 260.

The line attachment member 214 can be slidably positioned within the channel 250 and the chamber 260, and can freely travel along the predetermined length of the channel 250 and the chamber 260. The line attachment member 214, being slidably positioned within the channel 250 and the chamber 260, can provide for bidirectional movement of the line attachment member 214 within the channel 250 and the chamber 260, thereby providing multidirectional control of the fishing lure 200 according to the embodiments disclosed herein.

In various embodiments, the channel 250 and the chamber 260 can receive a stopper member 220. The adjustable stopper member 220 can include a variety of structures and materials. For example, the stopper member 220 can include a member made of rubber that forms a tight but adjustable fit inside the channel 250 and the chamber 260. The adjustability of the stopper member 220 can provide for the movement of the stopper member 220 to a desired location in the channel 250 and the chamber 260.

In various embodiments, the adjustable stopper member 220 can preclude the line attachment member 214 from moving past the stopper member 220, as discussed herein. That is, the stopper member 220 can be positioned within the channel and the chamber to restrict the line attachment member 214 from moving past the stopper member 220.

Additionally, in various embodiments, a rail can be positioned within the chamber 260. In such embodiments, the rail can include a first and second junction at each end of the chamber 260. The first and second junctions can function to anchor the rail to the elongate body 203 as discussed herein. In such embodiments, the line attachment member can be coupled to the rail and can extend through the opening 253 of the channel 250 such that the line attachment member can freely move along the rail as discussed herein.

Figure 3:
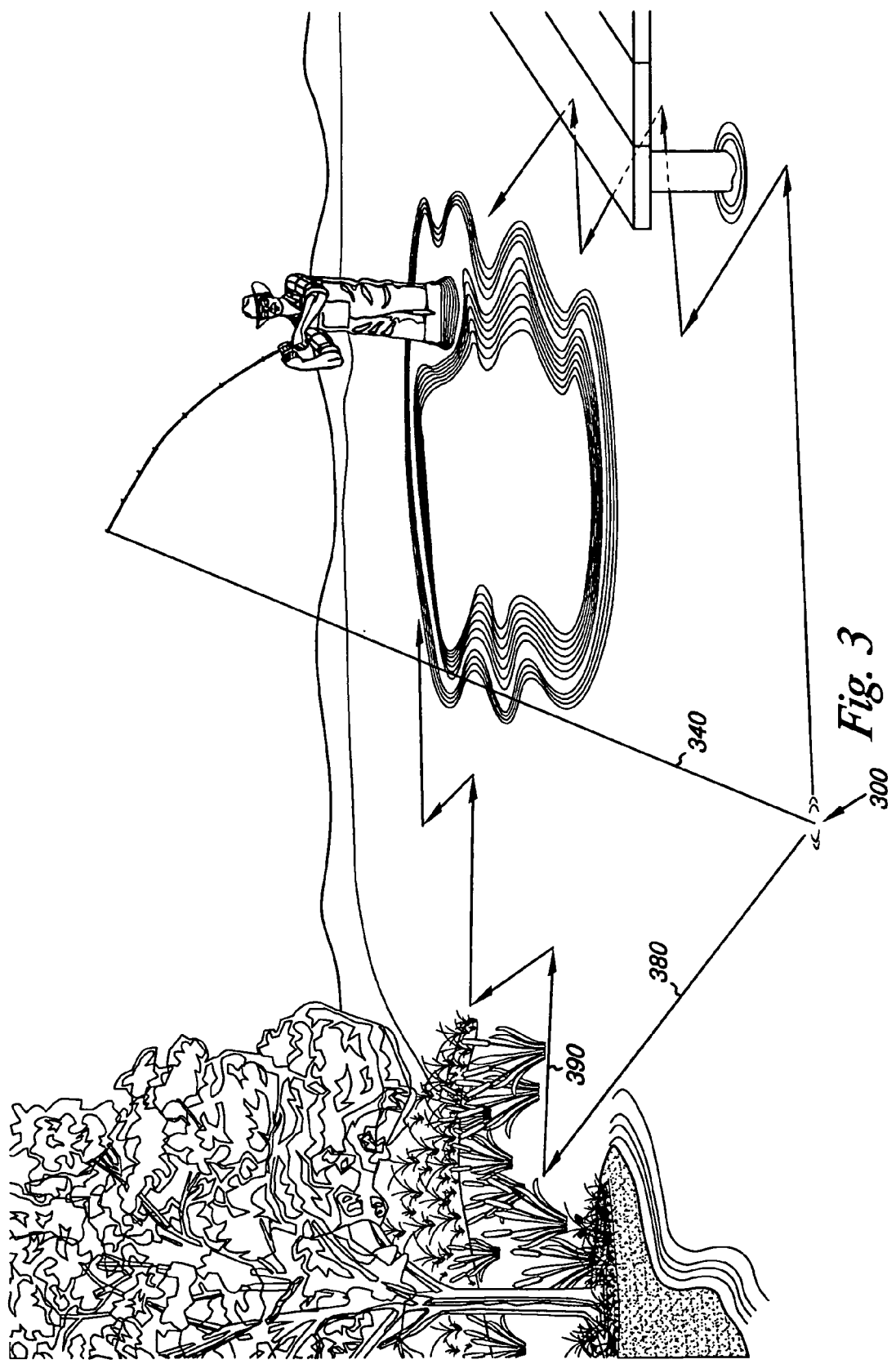
FIG. 3 illustrates a view of the multidirectional path that the lure can take to reach favorable fishing areas within a body of water.

FIG. 3 illustrates the multidirectional paths that the fishing lure 300 may take while traveling through water. As the angler pulls the fishing lure through the water, the angler can cause a line attachment member, such as the line attachment member 114 shown in FIG. 1A, to change locations on the rail by manipulating a fishing line 340. For example, if the angler desires a rightward direction 380 of travel of the fishing lure 300, the angler can manipulate the fishing line 340 to cause the line attachment member 114 to slide to the right until it is precluded from moving by either a stopper member, such as the stopper member 120 shown in FIG. 1B, or a first junction, such as the first junction 110 shown in FIG. 1. After the lure 300 has traveled in a rightward direction to a desired location in the water, the angler can change the direction of travel of the fishing lure 300 to a leftward direction 390 by again manipulating the fishing line 340 to cause the line attachment member 114 to slide to the left until it is precluded from moving by either a stopper member 120 or a second junction 112.

While the present invention has been shown and described in detail above, it will be clear to the person skilled in the art that changes and modifications may be made without departing from the spirit and scope of the invention. As such, that which is set forth in the foregoing description and accompanying drawings is offered by way of illustration only and not as a limitation. The actual scope of the invention is intended to be defined by the following claims, along with the full range of equivalents to which such claims are entitled.

In addition, one of ordinary skill in the art will appreciate upon reading and understanding this disclosure that other variations for the invention described herein can be included within the scope of the present invention.

For example, in some embodiments, the device assembly can include a fishing bobber. In such embodiments, the device assembly can be formed from buoyant materials. A number of fishing hooks can be coupled to the fishing bobber using fishing line, fishing leaders, and the like. In various embodiments, the fishing hooks can be coupled at a distance from the fishing bobber.

In use, the fishing bobber can, for example, be attached to a fishing line and/or leader connected to the hooks by extending the fishing line/leader through the first rail end and/or the second rail end as discussed herein. As one of ordinary skill in the art will appreciate, hooks can be directly or indirectly connected to other connecting points on the fishing bobber such as at the line attachment member or through coupling members, such as eyelets attached to the fishing bobber, as discussed herein.

In this way, a hook attached at a distance from the fishing bobber may be maintained at a specific level within a body of water when the fishing bobber is floating in the water. Control of the bobber is provided by a slidable line attachment member as such structures are discussed herein. Also, when the fishing bobber is in the water, ballast of the device assembly can cause the lower portion to be oriented downwards as discussed herein.

With respect to the above description, it is to be realized that the optimum dimensional relationships for the various parts of the invention include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

In the foregoing Detailed Description, various features are grouped together in several embodiments for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A fishing device, comprising:
a device assembly including an elongate body having a direction of elongation, a first end and a second end, and a front surface having a cross-sectional concave shape substantially throughout a length of the body and the shape being oriented generally perpendicular to the direction of elongation;
an elongate rail provided along the front surface of the elongate body positioned generally along the direction of elongation of the elongate body, wherein the elongate rail receives a line attachment member that is slidable along the elongate rail at least across a midpoint between the first and second ends of the elongate body and wherein at least two portions of the elongate rail extend into the front surface of the elongate body; and
a first eyelet at the first end and a second eyelet at the second end, each eyelet having a fish hook attached thereto.

2. The fishing device of claim 1, wherein the elongate rail at least two portions comprise first and second junctions, and wherein the first junction is defined by a portion of the rail on a first end that interfaces the elongate body and the second junction is defined by a portion of the rail on a second end that interfaces the elongate body.

3. The fishing device of claim 2, wherein the first junction and the second junction of the rail define a length of the rail at most fifty percent of the length of the elongate body.

4. The fishing device of claim 1, wherein the rail receives at least one adjustable stopper member to restrict the slidability of the line attachment member.

5. The fishing device of claim 1, wherein the at least two portions extend through the elongate body and form the first and second eyelets respectively to receive the fish hooks thereon.

6. The fishing device of claim 1, wherein the elongate rail is positioned at a distance from the front surface of the elongate body.

7. The fishing device of claim 1, wherein the elongate body is constructed of a bouyant material.

8. A fishing lure, comprising:
a bait assembly having an elongate body, the elongate body including a front surface having a direction of elongation and wherein the front surface has a cross-sectional concave shape substantially throughout a length of the body and the shape being oriented generally perpendicular to the direction of elongation;
an elongate structure positioned generally along the direction of the elongation of the front surface of the elongate body and separated by a distance from the front surface, wherein the elongate structure receives a line attachment member that is slidable along the elongate structure at least across a midpoint between a first end and a second end of the elongate body to allow a rightward and leftward travel of the bait assembly through water relative to an angler manipulating the bait assembly; and a first eyelet at the first end and a second eyelet at the second end, each eyelet having a fish hook attached thereto.

9. The fishing lure of claim 8, wherein the elongate structure includes a rail having at least one adjustable stopper member to restrict the slidability of the line attachment member along the rail.

10. The fishing device of claim 8, wherein the elongate body includes a back surface opposite the front surface, and the back surface having a convex shape.

11. The fishing device of claim 10, wherein the first surface includes a first face region at the first end and a second face region at the second end, each face region angling toward the back surface.

12. The fishing device of claim 11, wherein:

the back surface of the first face region has a cross-sectional non-concave shape when viewed from the first end; and the back surface of the second face region has a cross-sectional non-concave shape when viewed from the second end.

13. A fishing lure, comprising:

a bait assembly having an elongate body with a first end, a second end, and a front surface having a direction of elongation and wherein the front surface has a cross-sectional concave shape substantially throughout a length of the body and the shape being oriented generally perpendicular to the direction of elongation;

an elongate rail positioned generally along the direction of the elongation of the front surface of the elongate body and separated by a distance from the front surface and having a first junction and a second junction provided along the front surface of the elongate body at a location where at least two portions of the elongate rail extend into and are embedded into the elongate body, wherein the rail receives a line attachment member that is slidable along the rail at least across a midpoint between the first and second ends of the elongate body; and a first eyelet at the first end and a second eyelet at the second end, each eyelet having a fish hook attached thereto.

14. The fishing lure of claim 13, wherein the elongate rail includes a first junction and a second junction that define a length of the rail at least fifty percent of a length of the elongate body.

15. The fishing lure of claim 13, wherein the elongate rail includes a first junction and a second junction that define a length of the rail at most fifty percent of a length of the elongate body.

* * * * *